United States Patent

Zornes

[11] Patent Number: 5,078,017
[45] Date of Patent: Jan. 7, 1992

[54] MOTION TRANSLATION DEVICE OF SCOTCH YOKE TYPE

[75] Inventor: Davied A. Zornes, Redmond, Wash.

[73] Assignee: Balanced Engines, Inc., Tacoma, Wash.

[21] Appl. No.: 518,961

[22] Filed: May 4, 1990

[51] Int. Cl.⁵ .............................................. F01B 9/00
[52] U.S. Cl. ......................................................... 74/50
[58] Field of Search ............................................. 74/50

[56] References Cited

U.S. PATENT DOCUMENTS

| | | | |
|---|---|---|---|
| 2,515,795 | 7/1950 | Patrignani | 74/50 |
| 2,529,997 | 11/1950 | Browne | 74/50 |
| 2,764,188 | 9/1956 | Hoffman | 74/50 |
| 2,858,711 | 11/1957 | Blackstone et al. | 74/50 |
| 3,017,779 | 7/1958 | Beals | 74/50 |
| 3,246,528 | 4/1966 | Kosch | 74/50 |
| 3,424,015 | 1/1969 | Lundy et al. | 74/50 |
| 3,816,036 | 6/1974 | Rogers et al. | 74/50 |
| 4,056,011 | 11/1977 | Carlson | 74/50 |
| 4,072,210 | 2/1978 | Chien | 74/50 |
| 4,090,413 | 5/1978 | Vickland | 74/50 |
| 4,559,838 | 12/1985 | Neuenschwander | 74/50 |
| 4,915,019 | 4/1990 | Hovaguimian | 74/50 |

FOREIGN PATENT DOCUMENTS

| | | | |
|---|---|---|---|
| 0210700 | 8/1960 | Austria | 74/50 |
| 0632863 | 11/1978 | U.S.S.R. | 74/50 |

*Primary Examiner*—R. Skudy
*Assistant Examiner*—Thomas M. Dougherty
*Attorney, Agent, or Firm*—Seed and Berry

[57] ABSTRACT

A motion translation device uses a slotted head similar to that used in scotch yoke devices in which tracks are provided at opposite sides of the slot, but laterally offsets the tracks relative to one another and uses two coaxial rollers, each engaging only a respective one of the tracks. The rollers are journaled on a rotating member in offset relation to the rotary axis of the rotating member.

4 Claims, 2 Drawing Sheets

MOTION TRANSLATION DEVICE OF SCOTCH YOKE TYPE

TECHNICAL FIELD

The present invention relates to motion translation devices of the scotch yoke type in that it translates rotary motion into linear motion, or vice versa, in a similar manner.

BACKGROUND OF THE INVENTION

Scotch yoke type devices have heretofore required slides or at least three rollers operating on multiple axes to reciprocate along the tracks presented at opposite sides of the slot in the yoke head. The present invention simplifies such arrangements by requiring only two rollers and only one roller axis.

SUMMARY OF THE INVENTION

Simplification is accomplished by laterally offsetting the tracks and having two coaxial rollers each arranged to engage only a respective one of the tracks. The coaxial rollers are journaled, for example, on a motor-driven crank.

The invention also provides for mechanical transfer of rotary motion from one location to an adjacent location without use of gears or belt or chain drives. This is accomplished by providing two slotted heads each with the offset tracks and roller arrangement mentioned above. These two heads are rigidly connected together in series on a linearly movable member to move together linearly. The rollers acting on the tracks of one of the heads are driven as by a motor-driven rotating crank, and the rollers for the other head are responsively reciprocated along their respective tracks to thereby impart rotation to a crank on which they are journaled.

DETAILED DESCRIPTION OF THE INVENTION

Figure 1:
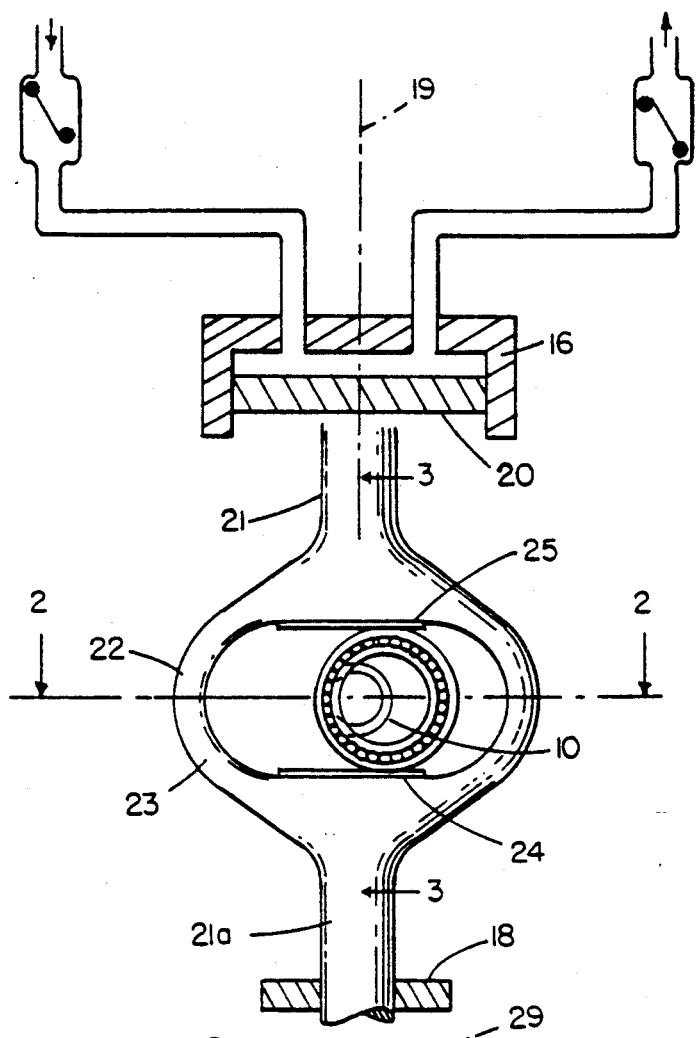
FIG. 1 is a plan view with associated parts in section, illustrating a device embodying the present invention.
Figure 2:
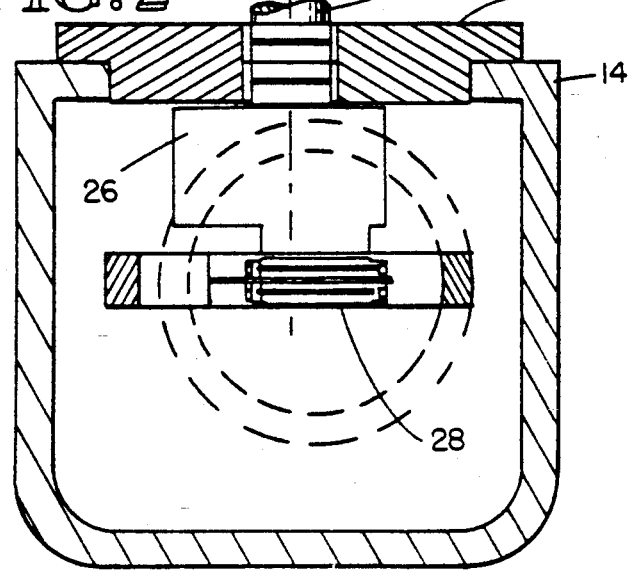
FIG. 2 is a transverse sectional view taken as indicated by line 2—2 in FIG. 1 and including a housing not shown in FIG. 1.
Figure 3:
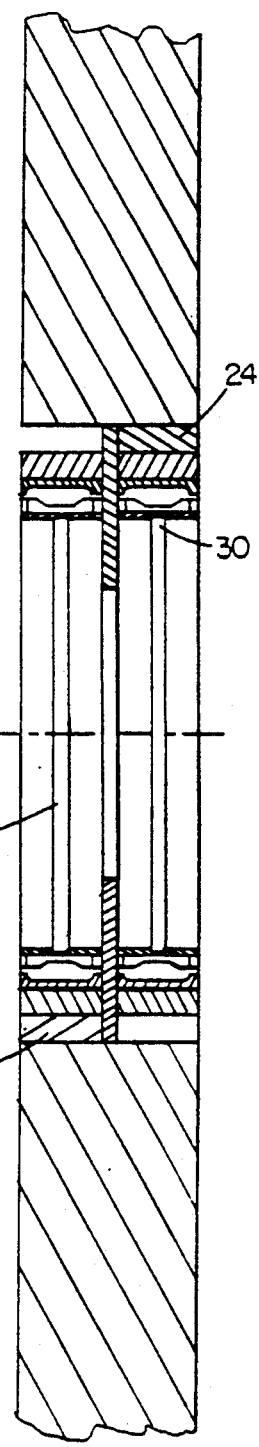
FIG. 3 is a detail exploded sectional view taken as indicated by line 3—3 in FIG. 1.

Referring to the drawings, a drive shaft 10 extends through bearings 12 into a housing assembly 14 providing a cylinder 16 and a linear guide 18 together defining a reciprocation axis 19 for a piston 20 working in the cylinder 16. Mounted on the piston 20 is a reciprocating member 21 having a central head 22 and having a slide portion 21a received by the guide 18.

The head 22 has a transverse slot 23 on opposite sides of which are mounted two parallel tracks roller 24 and 25. These tracks are laterally offset relative to one another and their longitudinal center lines occupy respective planes parallel to the reciprocating axis 19 and on opposite sides thereof. The drive shaft 10 has a crank 26 having an axle stub 28 offset from the rotation axis 29 of the shaft 10 and defining a roller axis. It will be noted that the rotation axis 29 intersects the reciprocation axis 19 at right angles thereto. Journaled on the axle stub 28 are two side-by-side coaxial rollers 30, 31, arranged so that roller 30 rolls along track 24 and roller 31 rolls along track 25. Roller 30 does not engage track 25, and roller 31 does not engage track 24.

It will be appreciated that when shaft 10 is turned and crank 26 responsively rotates, the rollers 30, 31 will linearly reciprocate along the tracks and the piston 20 will linearly reciprocate in the cylinder 16 along the reciprocation axis 19.

Figure 4:
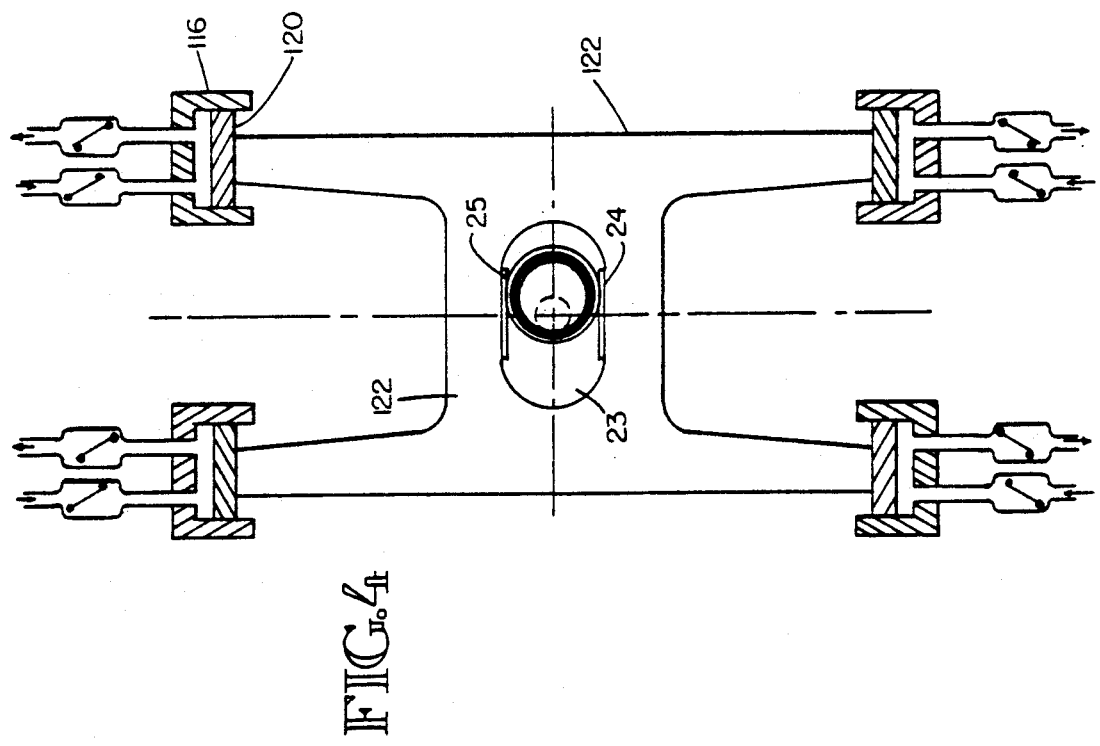
FIG. 4 is a view taken like FIG. 1 showing the invention applied to a multiple piston embodiment.

As shown in FIG. 4, the linearly moving member 21 can take the form of an H-member 121 with four legs each connected to a piston 120 operating in a fixed cylinder 116. The H-member 121 has a central head 122 which provides the slot 23 with laterally offset tracks 24, 25 as before. When the coaxial rollers 30, 31 operate on the tracks 24, 25 of the H-member 121 responsive to turning of an associated crank 26 as before, the four pistons 120 are reciprocated.

Figure 5:
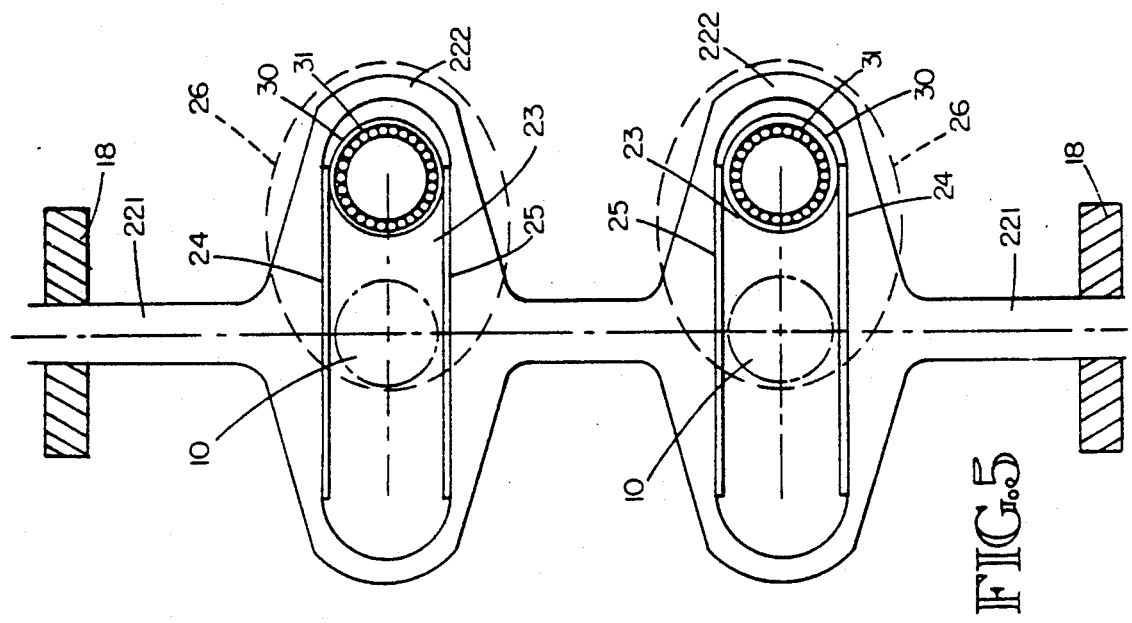
FIG. 5 is a view taken like FIG. 1 showing the invention applied to a multiple head embodiment.

Referring to FIG. 5, there is shown another application of the invention in which the linearly moving member can take the form of a double-headed member 221 with a pair of heads 222 each having a slot 23 containing laterally offset tracks 24, 25. Respective coaxial pairs of rollers 30, 31 operate on the tracks in each head 222 and are journaled on respective cranks 26 as before. With this arrangement, when one of the cranks 26 is motor driven via shaft 10, for example, the other crank and related shaft will responsively rotate since both pairs of rollers 30, 31 will reciprocate in unison within the slotted heads 222. It will be appreciated that the heads 222 can be connected to move together by means of a flexible cable rather than by a rigid connection. In such a case, the two crankshafts do not have to be parallel to one another.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A motion translation system comprising:
   a piston;
   a head connected to said piston and having a set of two roller tracks spaced apart an equal distance along their length, the longitudinal center lines of said tracks occupying respective ones of laterally spaced parallel planes;
   means mounting said piston to reciprocate linearly along a reciprocation axis which is parallel to said parallel planes;
   a set of two coaxial rollers mounted to turn about a roller axis at the center of the rollers and rolls only on respective ones of said tracks, said roller axis being perpendicular to said parallel planes; and
   means for bodily rotating said rollers and roller axis about a rotation axis which is parallel to and offset from said roller axis, and which passes through said reciprocation axis in perpendicular relation to said reciprocation axis and said parallel planes.

2. A motion translation system comprising:
   multiple pistons;
   a head connected to said piston and having a set of two roller tracks spaces apart an equal distance along their length, the longitudinal center lines of said tracks occupying respective ones of laterally spaced parallel planes;

means mounting said pistons to reciprocate linearly along a reciprocation axis which is parallel to said parallel planes;

a set of two coaxial rollers mounted to turn about a roller axis at the center of the rollers and roll only on respective ones of said tracks, said roller axis being perpendicular to said parallel planes; and means for bodily rotating said rollers and roller axis about a rotation axis which is parallel to and offset from said roller axis, and which passes through said reciprocation axis in perpendicular relation to said reciprocation axis and said parallel planes.

3. A motion translation system comprising:

a first head having a set of two roller tracks spaced apart equal distance along their length, the longitudinal center liens of said tracks occupying respective ones of laterally spaced parallel planes;

means mounting said first head to reciprocate linearly along a reciprocation axis which is parallel to said parallel planes;

a set of two coaxial rollers mounted to turn about a roller axis at the center of the rollers and roll only on respective ones of said tracks, said roller axis being perpendicular to said parallel planes;

means for bodily rotating said rollers and roller axis about a rotation axis which is parallel to and offset from said roller axis, and which passes through said reciprocation axis perpendicular relation to said reciprocation axis and said parallel planes; and a second head connected to said first head and arranged to move along linear reciprocation axis, said second head having a second set of tracks and a second complementing set of coaxial rollers mounted like the first mentioned set of tracks and set of rollers.

4. A system according to claim 3 in which said second set of rollers is mounted to turn about a second roller axis on respective ones of said second set of tracks; and means for bodily rotating said second set of rollers and second roller axis about a rotation axis which is parallel to and offset from said second roller axis, and which is parallel to the rotation axis referred to in claim 7.

* * * * *

UNITED STATES PATENT AND TRADEMARK OFFICE
CERTIFICATE OF CORRECTION

PATENT NO. : 5,078,017
DATED : January 7, 1992
INVENTOR(S) : David A. Zornes

It is certified that error appears in the above-identified patent and that said Letters Patent is hereby corrected as shown below:

In column 2, claim 1, line 56 please delete "rolls" and substitute therefor -- roll --.

In column 4, claim 4, line 23, please delete "7" and substitute therefor -- 3 --.

Signed and Sealed this

Eighteenth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,078,017

DATED : January 7, 1992

INVENTOR(S) : David A. Zornes

It is certified that error appears in the above-identified patent and that said Letters Patent is hereby corrected as shown below:

On the title page, please change the inventor's name to -- David A. Zornes--.

In column two, claim one, line 56, please delete "rolls" and substitute therefor --roll--.

In column four, claim four, line 23, please delete "7" and substitute therefor --3--.

This Certificate supersedes Certificate of Correction issued May 18, 1993.

Signed and Sealed this

Seventh Day of December, 1993

Attest:

BRUCE LEHMAN

Attesting Officer

Commissioner of Patents and Trademarks